(12) United States Patent
Kwon et al.

(10) Patent No.: US 11,332,672 B2
(45) Date of Patent: *May 17, 2022

(54) LIQUID CRYSTAL ALIGNMENT AGENT COMPOSITION, METHOD OF PREPARING LIQUID CRYSTAL ALIGNMENT FILM, AND LIQUID CRYSTAL ALIGNMENT FILM, LIQUID CRYSTAL DISPLAY USING THE SAME

(71) Applicant: LG CHEM, LTD., Seoul (KR)

(72) Inventors: Soonho Kwon, Daejeon (KR); Hyeongseuk Yun, Daejeon (KR); Jung Ho Jo, Daejeon (KR); Sungjoon Min, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/059,145

(22) PCT Filed: Jan. 22, 2020

(86) PCT No.: PCT/KR2020/001118
§ 371 (c)(1),
(2) Date: Nov. 25, 2020

(87) PCT Pub. No.: WO2020/171401
PCT Pub. Date: Aug. 27, 2020

(65) Prior Publication Data
US 2021/0214616 A1    Jul. 15, 2021

(30) Foreign Application Priority Data
Feb. 21, 2019 (KR) .................. 10-2019-0020506

(51) Int. Cl.
*C09K 19/56* (2006.01)
*B01J 31/02* (2006.01)
*G02F 1/1337* (2006.01)

(52) U.S. Cl.
CPC .......... *C09K 19/56* (2013.01); *B01J 31/0237* (2013.01); *G02F 1/133723* (2013.01); *G02F 1/133784* (2013.01); *G02F 1/133788* (2013.01); *C09K 2323/027* (2020.08)

(58) Field of Classification Search
CPC .............. C09K 19/56; C09K 2323/00; C09K 2323/02; C09K 2323/027; B01J 31/0237; G02F 1/1337; G02F 1/133711; G02F 1/133723; G02F 1/133796; G02F 1/133788
USPC .................. 428/1.1, 1.2, 1.25, 1.26; 349/123
See application file for complete search history.

(56) References Cited

U.S. PATENT DOCUMENTS 3,485,806 A   12/1969  Bloomquist et al.
8,466,238 B2   6/2013  Tamatani et al.
10,351,661 B2  7/2019  Zhou et al.
10,377,928 B2  8/2019  Chao et al.
2010/0285292 A1  11/2010  Ishiwata et al.
2012/0172542 A1   7/2012  Tsai
2016/0178968 A1   6/2016  Miyake et al.
2019/0300644 A1  10/2019  Zhou et al.
2019/0330502 A1  10/2019  Chao et al.

FOREIGN PATENT DOCUMENTS

| CN | 101151302 A | 3/2008 |
|---|---|---|
| JP | 2016-151652 A | 8/2016 |
| JP | 2018-045180 A | 3/2018 |
| KR | 10-2008-0016816 A | 2/2008 |
| KR | 10-2009-0023642 A | 3/2009 |
| KR | 10-2009-0061376 A | 6/2009 |
| KR | 10-2010-0066551 A | 6/2010 |
| KR | 10-2011-0004537 A | 1/2011 |
| KR | 10-2013-0072933 A | 7/2013 |
| KR | 10-1286414 B1 | 7/2013 |
| KR | 10-2014-0141620 A | 12/2014 |
| KR | 10-2016-0076142 A | 6/2016 |
| KR | 10-2016-0101645 A | 8/2016 |
| KR | 10-2017-0111550 A | 10/2017 |
| KR | 10-2018-0090863 A | 8/2018 |
| WO | 2006-126555 A1 | 11/2006 |
| WO | 2015-016121 A1 | 2/2015 |

OTHER PUBLICATIONS

International Search Report issued for International Application No. PCT/KR2020/001118 dated May 7, 2020, 4 pages.
Nubushi, S. et al., "Tough Epoxy Resins Cured with Aminimides", Journal of Polymer Science: Part A Polymer Chemistry, 1988, vol. 26, pp. 1779-1789.
Kirino, et al., "Aminimides Derived from Benzoylformic Acid Esters as Thermally Latent", Macromolecules, 2010, vol. 43, No. 21, pp. 8821-8827 (Oct. 14, 2010).
Kirino, et al., Structure-Initiator Activity Dependence of Aminimides as Thermally Latent Initiators in the Polymerization of Glycidyl Phenyl Ether, Journal of Polymer Science: Part A: Polymer Chemistry, vol. 38, 3428-3433 (2000).
International Search Report issued for International Application No. PCT/KR2019/014827 dated Mar. 4, 2020, 4 pages.
Kirino, M. et al., "Aminimides Derived from p-Substituted Benzoylformic Acid Ester as Thermal/Photolatent Bases and Photoradical Initiators", Journal of Polymer Science, Part A: Polymer Chemistry, 2013, vol. 51, pp. 4292-4300.

*Primary Examiner* — Ruiyun Zhang

(74) *Attorney, Agent, or Firm* — Rothwell, Figg, Ernst & Manbeck, P.C.

(57) ABSTRACT

The present invention relates to a liquid crystal alignment agent composition comprising a polymerizable liquid crystal alignment polymer; and a catalyst precursor compound of a specific structure, a method for preparing a liquid crystal alignment film using the same, and a liquid crystal alignment film and a liquid crystal display using the same.

15 Claims, No Drawings

LIQUID CRYSTAL ALIGNMENT AGENT COMPOSITION, METHOD OF PREPARING LIQUID CRYSTAL ALIGNMENT FILM, AND LIQUID CRYSTAL ALIGNMENT FILM, LIQUID CRYSTAL DISPLAY USING THE SAME

CROSS-REFERENCE TO RELATED APPLICATION(S)

This application is a 35 U.S.C. 371 National Phase Entry Application from PCT/KR2020/001118, filed on Jan. 22, 2020, designating the United States, which claims the benefit of Korean Patent Application No. 10-2019-0020506 filed on Feb. 21, 2019 with the Korean Intellectual Property Office, the disclosures of which are herein incorporated by reference in their entirety.

TECHNICAL FIELD

The present invention relates to a liquid crystal alignment agent composition that exhibits a sufficient imidization ratio in the low-temperature baking process and can realize excellent electrical properties and alignment property, a method for preparing a liquid crystal alignment film using the same, and a liquid crystal alignment film and a liquid crystal display using the same.

BACKGROUND OF THE INVENTION

Currently, in accordance with the trend toward the high-speed and high density of information transfer, and requirement of consumers for high-quality products such as large screen, high-quality images, multifunction and high performance, large-sized flat panel displays (FPD) has appeared. In accordance with large size and slimness of displays and an increase in demand of notebook PCs, various types of flat panel displays such as LCDs, PDPs, rear-projection TVs have been developed and commercialized.

However, in the case the displays are exposed to external light such as natural light, the surface reflection light provides fatigue feeling to eyes of the user or causes a headache, and an image clarity that is formed in the display is not recognized as a clear image.

That is, in an image display device such as an organic light emitting device (OLED) or a liquid crystal display (LCD), it is required to prevent a glare phenomenon, a color shift, a reduction in contrast due to a reflection of external light or a reflection of image, or a deterioration of visibility. In order to reduce a reflection of an image and a reflection of light by using scattering of light or optical interference, methods such as forming an optical laminated film such as an antireflection film on the surface of an image display device or changing the structure of an organic light emitting device (OLED) panel have been proposed.

Meanwhile, in a liquid crystal display, a liquid crystal alignment film performs a function for aligning liquid crystals in a constant direction. Specifically, the liquid crystal alignment film functions as a director in the arrangement of liquid crystal molecules, and thus, when liquid crystals move by an electric field to form an image, it makes them headed in a proper direction. In order to obtain uniform brightness and high contrast ratio in a liquid crystal display, it is essential to uniformly align liquid crystals.

As one of the existing methods of aligning liquid crystals, a method of applying a polymer film such as polyimide on a substrate such as glass, and rubbing the surface to a constant direction using fiber such as nylon or polyester was used. However, such a rubbing method may generate powdery dust or electrical discharge (ESD) when the fiber and polymer film are rubbed, thus causing a serious problem when preparing a liquid crystal panel.

In order to solve the problem of the rubbing method, a photo-alignment method is being recently studied, wherein anisotropy is induced to a polymer film by light irradiation instead of friction, and liquid crystals are arranged using the anisotropy.

As the material that can be used in the photo-alignment method, various materials have been introduced, and among them, polyimide is being mainly used for good performances of a liquid crystal alignment film. However, since polyimide has low solubility in a solvent, it is difficult to directly apply for a preparation process comprising coating in a solution state to form an alignment film.

Thus, a precursor such as polyamic acid or polyamic acid ester having excellent solubility is coated, which is then heat treated at 200° C. to 230° C. to form polyimide, which is irradiated by light, thereby progressing alignment treatment.

However, as the polyamic acid remaining in polyimide during the high-temperature baking process, or the polyamic acid formed by the progress of depolymerization reaction from polyimide is subjected to a side reaction, there is a limitation that a liquid crystal display device cannot satisfy a high level of afterimage properties for realizing high-quality driving properties.

Thus, there is a demand for the development of a liquid crystal aligning agent composition capable of realizing a sufficient imidization ratio in the low temperature baking process, improving electrical properties, achieving alignment properties as the liquid crystal alignment film, and further effectively preventing a deterioration in visibility.

BRIEF SUMMARY OF THE INVENTION

The present invention provides a liquid crystal alignment agent composition that exhibits a sufficient imidization ratio in the low-temperature baking process, can secure alignment polymer in an alignment film with high yield, and can realize excellent electrical properties and alignment property, The present invention also provides a method for preparing a liquid crystal alignment film using the liquid crystal alignment agent composition.

The present invention further provides a liquid crystal alignment film comprising the aligned and cured product of the liquid crystal alignment agent composition, and a liquid crystal display comprising the same.

A liquid crystal alignment agent composition comprising: a polymerizable liquid crystal alignment polymer; and a catalyst precursor compound represented by the following Chemical Formula 1, is provided herein:

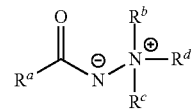

[Chemical Formula 1]

in the Chemical Formula 1, $R^a$ is a C1-10 alkyl group, a C1-10 alkoxy group, a C6-20 aryl group, a C6-20 arylcarbonyl group, or a C6-20 aryloxy group, $R^b$ and $R^c$ are each independently, hydrogen, a C1-10 alkyl group, a C1-10 alkoxy group, a C3-20 cycloalkyl group, or a C6-30 aryl group, $R^d$ is a C2-10 alkyl group, a C2-30 arylalkyl group, a C2-30 cycloalkylalkyl group, or a C2-10 alkoxyalkyl group substituted with at least one hydroxyl group (—OH).

A method for preparing a liquid crystal alignment film is also provided herein, which method comprises steps of:

applying the liquid crystal alignment agent composition on a substrate to form a coating;

drying the coating;

irradiating light to the coating or rubbing the coating to progress alignment treatment; and heat treating the alignment-treated coating to cure.

A liquid crystal alignment film comprising the aligned and cured product of the liquid crystal alignment agent composition, and a liquid crystal display comprising the same are also provided herein.

DETAILED DESCRIPTION OF THE INVENTION

Hereinafter, a liquid crystal alignment agent composition, a method for preparing a liquid crystal alignment film using the same, and a liquid crystal alignment film and a liquid crystal display using the same according to specific embodiments of the invention will be explained in more detail.

Throughout the specification, the following terms may be defined as follows, unless specifically limited.

As used herein, when any part "comprises" any constructional element, it does not mean that other constructional elements are excluded, but it means that other constructional elements can be further included, unless described to the contrary.

As used herein, the term "substitution" means that another functional group bonds instead of a hydrogen atom in the compound, and the substituted position is not limited as long as it is a position where a hydrogen atom is substituted, namely, a substituent can be substituted, and in case substituted with two or more substituents, the two or more substituents may be identical to or different from each other.

As used herein, the term "unsubstituted or substituted" means unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfone amide group; a phosphine oxide group; an alkoxy group; an aryloxy group; an alkyl thioxy group; an aryl thioxy group; an alkyl sulfoxy group; an aryl sulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing one or more selected from N, O and S atoms, or unsubstituted or substituted with a substituent in which two or more of the above described substituents are connected. For example, "a substituent in which two or more substituents are connected" may be a biphenyl group. Namely, a biphenyl group may be an aryl group, or it may be interpreted as a substituent in which two phenyl groups are connected.

As used herein,

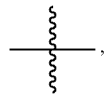, or ⸺* means a bond connected to other substituents, and a direct bond means a case wherein any atom does not exist in a part indicated by L.

An alkyl group may be linear or branched, and the carbon number is not specifically limited, but preferably 1 to 10. According to one embodiment, the carbon number of the alkyl group is 1 to 6. Specific examples of the alkyl group may include methyl, ethyl, propyl, n-propyl, isopropyl, butyl, n-butyl, isobutyl, tert-butyl, sec-butyl, 1-methylbutyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethyl-propyl, isohexyl, 2-methylpentyl, 4-methylhexyl, 5-methylhexyl, and the like, but are not limited thereto.

A haloalkyl group means the above explained alkyl group substituted with a halogen group, and the examples of the halogen group may include fluorine, chlorine, bromine or iodine. The haloalkyl group may be unsubstituted or substituted.

An aryl group is a monovalent functional group derived from arene, and is not specifically limited, but preferably, has a carbon number of 6 to 20, and it may be a monocyclic aryl group or a polycyclic aryl group. As the monocyclic aryl group, a phenyl group, a biphenyl group, a terphenyl group, and the like may be mentioned, but not limited thereto. As the polycyclic aryl group, a naphthyl group, an anthracenyl group, a phenanthryl group, a pyrenyl group, a perylenyl group, a chrysenyl group, a fluorenyl group, and the like may be mentioned, but not limited thereto. The aryl group may be unsubstituted or substituted.

A C6-20 arylcarbonyl group is a functional group in which an aryl group bonds to one end of a carbonyl group, and the above explanations about the aryl group may be applied thereto. The arylcarbonyl group may be unsubstituted or substituted.

A C6-20 aryloxy group is a functional group in which an aryl group bonds to one end of oxygen, and the above explanations about the aryl group may be applied thereto. The aryloxy group may be unsubstituted or substituted.

An alkylene group is a divalent functional group derived from alkane, and the above explanations about the alkyl group may be applied thereto, except that it is a divalent functional group. For example, it may be linear or branched, and may be methylene, ethylene, propylene, isobutylene, sec-butylene, tert-butylene, pentylene, hexylene, and the like. The alkylene group may be unsubstituted or substituted.

An arylene group is a divalent functional group derived from arene, and the above explanations about an aryl group may be applied thereto, except that it is a divalent functional group.

A C1-10 alkoxy group may be a linear, branched or cyclic alkoxy group. Specifically, a C1-10 alkoxy group may be a C1-10 linear alkoxy group; a C1-5 linear alkoxy group; a C3-10 linear or cyclic alkoxy group; or a C3-6 linear or cyclic alkoxy group. More specifically, as the C1-10 alkoxy group, a methoxy group, an ethoxy group, an n-propoxy group, an iso-propoxy group, an n-buthoxy group, an iso-buthoxy group, a tert-buthoxy group, an n-pentoxy group, an iso-pentoxy group, a neo-pentoxy group or a cycloheptoxy group, and the like may be mentioned. The alkoxy group may be unsubstituted or substituted.

A multivalent functional group is a residue in which plural hydrogen atoms bonded to any compound are removed, and for example, a divalent functional group, a trivalent functional group, a tetravalent functional group may be mentioned. For example, a tetravalent functional group derived from cyclobutane means a residue in which any 4 hydrogen atoms bonded to cyclobutane are removed.

A direct bond or a single bond means that any atom or atomic group does not exist in corresponding position, and thus, the position is connected by a bond-line. Specifically, it means a case wherein any atom does not exist in a part indicated by $R^a$, or $L_b$ (a and b are, respectively, an integer of 1 to 20) in the Chemical Formulas.

Throughout the specification, weight average molecular weight means weight average molecular weight converted in terms of polystyrene, measured by GPC method. During the process of measuring weight average molecular weight converted in terms of polystyrene measured by GPC, commonly known analysis equipment and detectors such as refractive index detector, and analysis columns may be used, and commonly applied temperature condition, solvent, flow rate may be applied. Specific examples of the measurement conditions are as follows: Polymer Laboratories PLgel MIX-B 300 mm length column and Waters PL-GPC220 device were used, the evaluation temperature was 160° C., 1,2,4-trichlorobenzene was used as a solvent, a flow rate was 1 mL/min, a sample was prepared at a concentration of 10 mg/10 mL and then fed in the amount of 200 μL, and then a calibration curve formed using a polystyrene standard was used, thereby calculating Mw value. As the polystyrene standard, 9 kinds having molecular weight of 2,000/10,000/30,000/70,000/200,000/700,000/2,000,000/4,000,000/10,000,000 were used.

Hereinafter, the present invention will be explained in detail.

I. Liquid Crystal Alignment Agent Composition

According to one embodiment of the invention, a liquid crystal alignment agent composition comprising a polymerizable liquid crystal alignment polymer; and a catalyst precursor compound represented by the Chemical Formula 1 can be provided.

The present inventors confirmed through experiments that as in the liquid crystal alignment agent composition of one embodiment, by mixing a polymerizable liquid crystal alignment polymer with a catalyst precursor compound having a structure represented by the Chemical Formula 1, in the preparation process of a liquid crystal alignment film, the catalyst precursor compound having a structure represented by the Chemical Formula 1 is decomposed into isocyanate and a catalyst compound represented by the Chemical Formula 7 described below, and thus, it exhibits a sufficient imidization ratio even when baked at low temperature, thereby preparing a liquid crystal film having excellent liquid crystal alignment properties and electrical properties.

It was also confirmed that in case the catalyst precursor compound having a structure represented by the Chemical Formula 1 is included in a liquid crystal alignment agent composition, the liquid crystal alignment agent composition exhibits excellent stability even during long-term storage.

Specifically, it was confirmed that by using the catalyst precursor compound having a structure represented by the Chemical Formula 1 as a catalyst in the present invention, compared to the previously used catalysts, generation of by-products may be decreased and storage stability may be secured, and simultaneously, a sufficient imidization ratio can be secured in the alignment film even after the baking process at a low temperature, thereby securing excellent properties of the alignment film.

Further, it was confirmed that in case the catalyst precursor compound having a structure represented by the Chemical Formula 1 is included in a liquid crystal alignment agent composition, when preparing a liquid crystal alignment film, isocyanate formed by decomposition of the catalyst precursor compound reacts with liquid crystal alignment polymer to form amide or urea, thereby improving the electrical properties of the liquid crystal alignment film, and the present invention was completed.

(1) Polymerizable Liquid Crystal Alignment Polymer

The liquid crystal alignment agent composition of one embodiment may comprise a polymerizable liquid crystal alignment polymer. In the liquid crystal alignment agent composition, liquid crystal alignment polymer may be used, which may be classified into degradable, polymerizable, curable, isomerizable, and the like according to the methods of aligning the liquid crystal alignment polymer.

In the present invention, polymerizable liquid crystal alignment polymer that secures alignment property by degradation of liquid crystal alignment polymer may be used. The polymerizable liquid crystal alignment polymer may react during photo-alignment or rubbing alignment treatment to induce anisotropy of the finally produced liquid crystal alignment film, and can be imidized and converted through a baking process after alignment to align the liquid crystal.

Specifically, the polymerizable liquid crystal alignment polymer may be implemented by using a structure in which a photopolymerizable reactive group is introduced into the main chain or side chain of the liquid crystal alignment polymer. The photopolymerizable reactive group may mean a reactive group in which a polymerization reaction due to cycloaddition may occur by irradiation with ultraviolet light. When the photopolymerizable reactive group is included in the main chain, alignment occurs by bonding between the main chains, and thus, the liquid crystal alignment performance may be maintained constant even under AC driving conditions.

The photopolymerizable reactive group is not particularly limited, but it may be, for example, a reactive group such as cinnamate, cinamide or chalcone.

As the polymerizable liquid crystal alignment polymer, a polyimide into which a photopolymerizable reactive group is introduced, a precursor thereof (polyamic acid or polyamic acid ester), or a mixture thereof can be used.

Irradiating a polarized ultraviolet ray to a polyimide precursor or polyimide such as polyamic acid ester and polyamic acid in which a photopolymerizable reactive group is introduced in the main chain or side chain induces [2+2] cycloaddition reaction. Due to this reaction, the liquid crystal may have its major axis aligned perpendicular or parallel to the direction of the irradiated polarized ultraviolet light. In addition, the photoreaction rate and stability may be further improved by the additional photoreaction of the C=C bond introduced into the polymer.

More specifically, the polymerizable liquid crystal alignment polymer included in the liquid crystal alignment agent composition of one embodiment may comprise one or more kinds of repeat units selected from the group consisting of repeat units represented by the following Chemical Formula 2, repeat units represented by the following Chemical Formula 3, and repeat units represented by the following Chemical Formula 4:

[Chemical Formula 2]

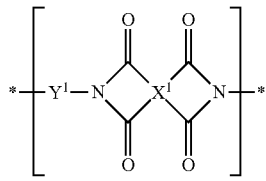

[Chemical Formula 3]

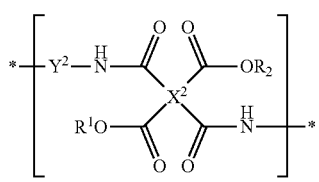

[Chemical Formula 4]

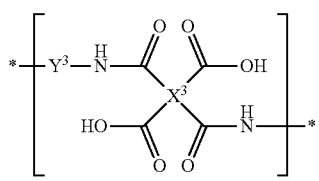

in the Chemical Formulas 2 to 4, at least one of $R^1$ and $R^2$ is a C1-10 alkyl group, and the other is hydrogen; $X^1$ to $X^3$ are each independently, a tetravalent functional group; and $Y^1$ to $Y^3$ are each independently, a divalent functional group including a photopolymerizable reactive group.

Namely, the polymer may include polymer consisting of one kind of polyamic acid repeat units, polymer consisting of one kind of polyamic acid ester repeat units, polymer consisting of one kind of polyimide repeat units, or copolymer including two or more kinds of the repeat units.

One or more kinds of repeat units selected from the group consisting of repeat units represented by the following Chemical Formula 2, repeat units represented by the following Chemical Formula 3, and repeat units represented by the following Chemical Formula 4 may form a main chain of the polymer.

Specifically, the polyimide repeat unit may include the repeat units represented by the Chemical Formula 2, the polyamic acid ester repeat unit may include the repeat units represented by the Chemical Formula 3, and the polyamic acid repeat unit may include the repeat units represented by the Chemical Formula 4.

In the Chemical Formulas 2 to 4, $X^1$ to $X^3$ may be identical to or different from each other, and each independently, a tetravalent functional group. The $X^1$ to $X^3$ may be a functional group derived from a tetracarboxylic dianhydride compound used for the synthesis of polyamic acid, polyamic acid ester or polyimide.

More specifically, the $X^1$ to $X^3$ may be each independently, one of the tetravalent functional groups described in the following Chemical Formula 5.

[Chemical Formula 5]

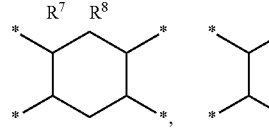

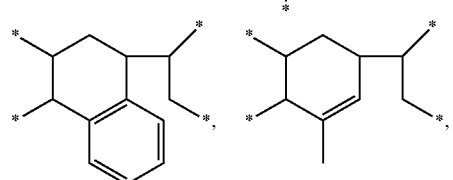

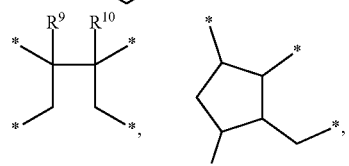

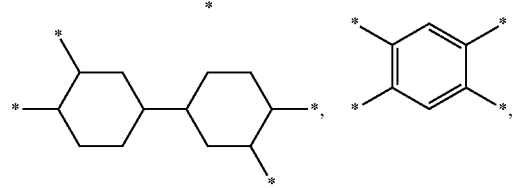 or

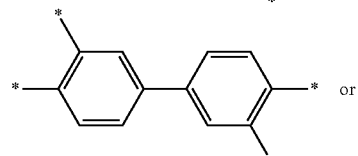

in the Chemical Formula 5, $R^5$ to $R^{10}$ are each independently, hydrogen, or C1-10 alkyl; $L^1$ is any one selected from the group consisting of a single bond, —O—, —CO—, —S—, —SO—, —SO$_2$—, —CR$^{11}$R$^{12}$—, —CONH—, —COO—, —(CH$_2$)$_b$—, —O(CH$_2$)$_b$O—, —COO—(CH$_2$)$_b$—OCO—, —R$^{13}$N—(CH$_2$)$_b$—NR$^{14}$—, phenylene or a combination thereof, where $R^{11}$ to $R^{14}$ are each independently, hydrogen, a C1-10 alkyl group, or C1-10 haloalkyl group; and b is an integer of 1 to 10.

More preferably, the $X^1$ to $X^3$ may be each independently selected from the group consisting of the following Chemical Formulae:

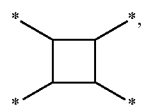 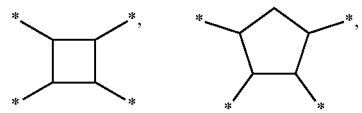

-continued

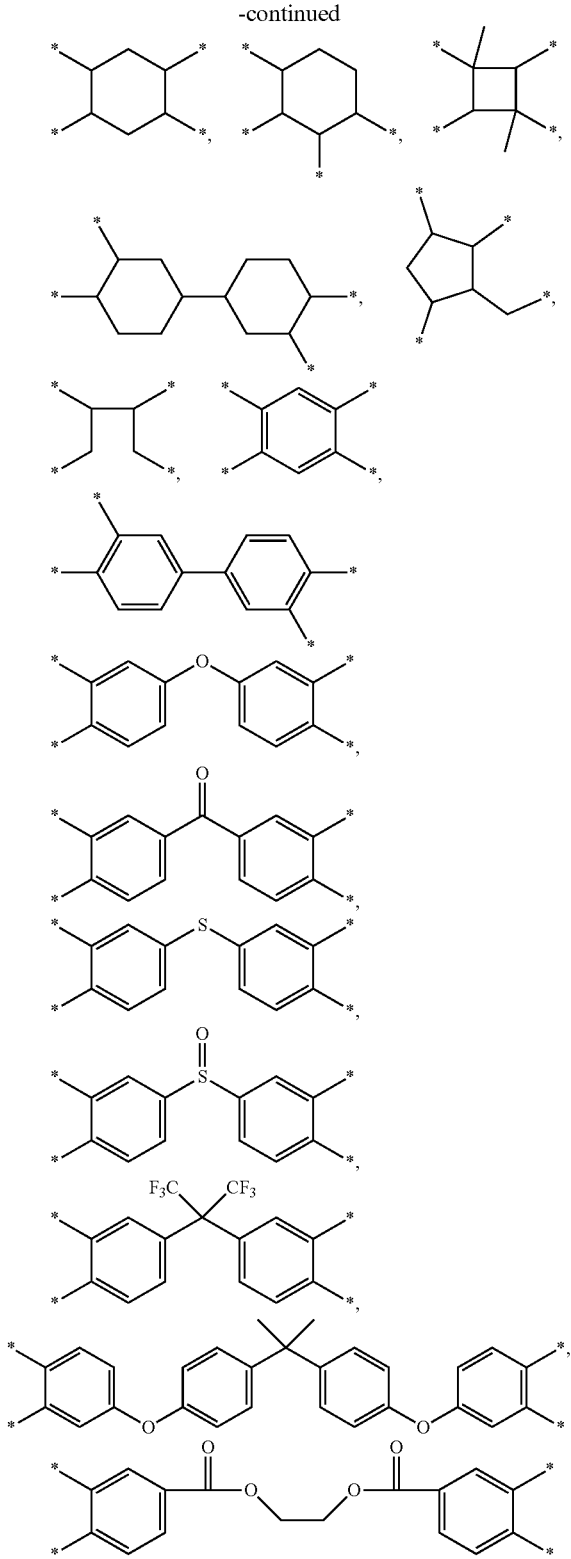

Meanwhile, in the Chemical Formulas 2 to 4, Y to $Y^3$ may be identical to or different from each other, and each independently, a divalent functional group including a photopolymerizable reactive group. The $Y^1$ to $Y^3$ may be a functional group derived from a diamine compound used for the synthesis of polyamic acid, polyamic acid ester or polyimide. Namely, it may be a functional group derived from a diamine compound containing a photopolymerizable reactive group.

Specifically, the divalent functional group including the photopolymerizable reactive group may include one of divalent organic groups represented by the following Chemical Formula 6-1 to Chemical Formula 6-3.

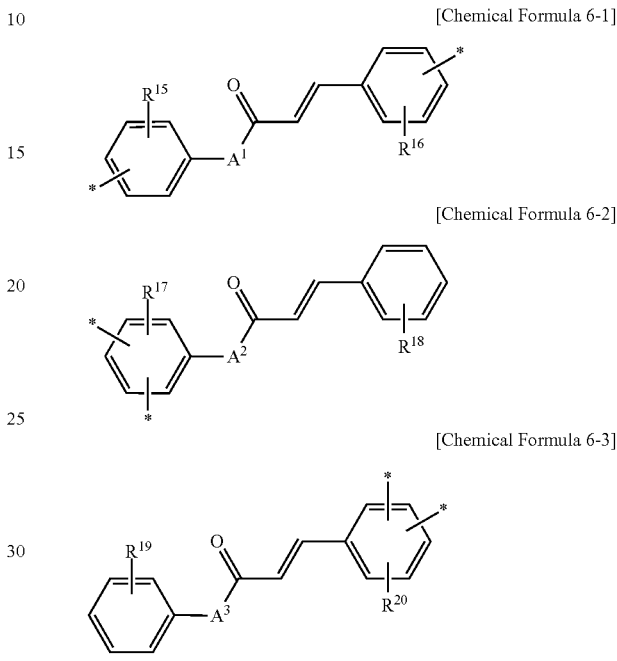

in the Chemical Formula 6-1 to Chemical Formula 6-3, $A$ and $A^3$ is a direct bond, —O—, —S—, —NH—, or a C1-10 alkylene group, and $R_{15}$ to $R_{20}$ are each independently, hydrogen or a C1-10 alkyl group.

Preferably, in the Chemical Formula 6-1 to Chemical Formula 6-3, the $R^{15}$ to $R^{20}$ may be each independently, hydrogen, 2-methyl, 3-methyl, 2,3-dimethyl, 2,6-dimethyl, or 3,5-dimethyl.

Further, preferably, the $A^1$ to $A^3$ may be —O—, —NH—, —(CH$_2$)—, or —(CH$_2$)$_2$—

(2) A Catalyst Precursor Compound

The liquid crystal alignment agent composition of one embodiment may comprise a catalyst precursor compound in addition to the above-mentioned polymer, and the catalyst precursor compound may have a specific chemical structure represented by the Chemical Formula 1. The physical/chemical properties of the catalyst precursor compound seem to result from the specific structure of the above-mentioned Chemical Formula 1.

The catalyst precursor compound means a compound that exists as a precursor in the liquid crystal alignment agent composition of room temperature, but is decomposed into a catalyst compound during the preparation process of a liquid crystal alignment film.

Specifically, the catalyst precursor compound represented by the Chemical Formula 1 is stably maintained in the liquid crystal alignment agent composition of room temperature, but at high temperature of 100° C. or more, it may be decomposed into amino alcohol and isocyanate by Curtius rearrangement.

Amino alcohol obtained by Curtius rearrangement may act as a strong catalyst compound, and isocyanate obtained by Curtius rearrangement may react with carboxylic acid in the liquid crystal alignment polymer to form amide or react with amine to form urea, thus improving the electrical properties of the liquid crystal alignment film.

By using such characteristics, the present inventors included the catalyst precursor compound represented by the Chemical Formula 1 in the liquid crystal alignment agent composition, thereby improving the solution stability of the liquid crystal alignment agent composition of room temperature. And, during the process of forming a liquid crystal alignment film where the liquid crystal alignment agent composition is heat treated to high temperature of 100° C. or more, the catalyst precursor compound represented by the Chemical Formula 1 is decomposed into amino alcohol and isocyanate, thus inducing a polymerization reaction by the catalytic activity of amino alcohol. The amino alcohol acting as a catalyst in this way not only acts as a catalyst, but also induces the curing of the liquid crystal alignment film, thus contributing to improvement in film strength.

Specifically, the amino alcohol produced by the decomposition of the catalyst precursor compound represented by the Chemical Formula 1 not only induces polyamic acid or polyamic acid ester repeat units to be converted into polyimide repeat units, thus forming a liquid crystal alignment film having high degree of imidization, but also inhibits side reactions that produce non-soluble materials, thus improving stability.

In the Chemical Formula 1, $R^a$ is a C1-10 alkyl group, a C1-10 alkoxy group, a C6-20 aryl group, a C6-20 arylcarbonyl group, or a C6-20 aryloxy group; $R^b$ and $R^c$ are each independently, hydrogen, a C1-10 alkyl group, a C1-10 alkoxy group, a C3-20 cycloalkyl group, or a C6-30 aryl group; $R^d$ is a C2-10 alkyl group, a C2-30 arylalkyl group, a C2-30 cycloalkylalkyl group, or a C2-10 alkoxyalkyl group substituted with at least one hydroxyl group (—OH).

In the Chemical Formula 1, the arylalkyl group, cycloalkylalkyl group, and alkoxyalkyl group mean substituted alkyl groups. Specifically, the arylalkyl group means an alkyl group substituted with an aryl group, the cycloalkylalkyl group means an alkyl group substituted with a cycloalkyl group, and the alkoxyalkyl group means an alkyl group substituted with an alkoxy group.

The Chemical Formula 1 may be represented by the following Chemical Formula 1-1.

[Chemical Formula 1-1]

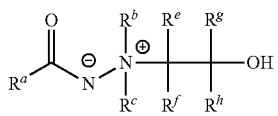

in the Chemical Formula 1-1, $R^a$, $R^b$ and $R^c$ are as defined in the Chemical Formula 1, and $R^e$, $R^f$, $R^g$ and $R^h$ are each independently, hydrogen, a C1-10 alkyl group, a C1-10 alkoxy group, a C3-20 cycloalkyl group, or a C6-30 aryl group.

Specifically, in the Chemical Formula 1-1, $R^e$ and $R^f$ may be hydrogen; one of $R^g$ and $R^h$ may be hydrogen, and the other may be hydrogen, a C1-10 alkyl group, a C1-10 alkoxy group, a C3-20 cycloalkyl group, or a C6-30 aryl group. Namely, the Chemical Formula 1 may be represented by the following Chemical Formula 1-2.

[Chemical Formula 1-2]

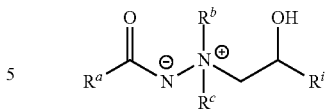

in the Chemical Formula 1-2, $R^a$, $R^b$ and $R^c$ are as defined in the Chemical Formula 1, and $R^i$ may be hydrogen, a C1-10 alkyl group, a C1-10 alkoxy group, a C3-20 cycloalkyl group, or a C6-30 aryl group.

Preferably, in the Chemical Formula 1-2, $R^a$, $R^b$, $R^c$ and $R^i$ may be each independently, a C1-10 alkyl group. As the examples of the C1-10 alkyl group, a methyl group, an ethyl group, and the like may be mentioned.

More preferably, the catalyst precursor compound represented by the Chemical Formula 1 may include a compound represented by the following Chemical Formula 1-a, or a compound represented by the following Chemical Formula 1-b.

[Chemical Formula 1-a]

[Chemical Formula 1-b]

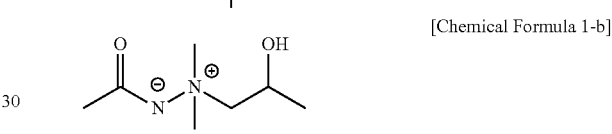

It is preferable that the catalyst precursor compound represented by the Chemical Formula 1 is included in the content of 0.1 parts by weight to 30 parts by weight, or 1 parts by weight to 30 parts by weight, or 1 parts by weight to 20 parts by weight, or 1 parts by weight to 10 parts by weight, based on 100 parts by weight of the polymer.

The catalyst precursor compound represented by the Chemical Formula 1 may be decomposed into a catalyst compound represented by the following Chemical Formula 7 and isocyanate represented by the following Chemical Formula 8 at a temperature of 100° C. or more.

[Chemical Formula 7]

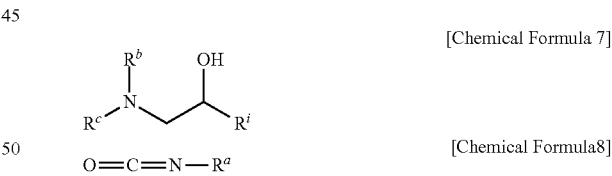

[Chemical Formula 8]

in the Chemical Formula 7 and Chemical Formula 8, $R^a$, $R^b$, $R^c$ and $R^i$ are as defined in the Chemical Formula 1-2.

The catalyst compound represented by the Chemical Formula 7 that is produced by the decomposition of the catalyst precursor compound represented by the Chemical Formula 1 may act as a catalyst of a polymerization reaction, and specifically, it may act as a catalyst of an imide polymerization reaction.

More specifically, the mechanism of Curtius rearrangement by which the catalyst precursor compound represented by the Chemical Formula 1-2 at a temperature of 100° C. is decomposed into the catalyst compound represented by the Chemical Formula 7 and isocyanate represented by the Chemical Formula 8 is as shown in the following Reaction Scheme 1.

[Reaction Scheme 1]

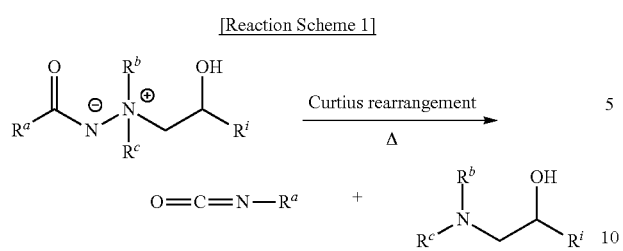

(3) Liquid Crystal Alignment Agent Composition

The present inventors confirmed through experiments that as in the liquid crystal alignment agent composition of one embodiment, by mixing a catalyst precursor compound having a structure represented by the Chemical Formula 1 and a polymerizable liquid crystal alignment polymer, the catalyst precursor compound having a structure represented by the Chemical Formula 1 is decomposed into isocyanate and amino alcohol during the preparation process of a liquid crystal alignment film, and thus, through high degree of imidization, a liquid crystal alignment film having excellent liquid crystal alignment property can be prepared.

The catalyst precursor compound having a structure represented by the Chemical Formula 1 may act as a precursor of polymerization catalyst, specifically, as a precursor of imidization catalyst.

The present inventors confirmed that in case the catalyst precursor compound having a structure represented by the Chemical Formula 1 is included in a liquid crystal alignment agent composition, amino alcohol produced by the decomposition of the catalyst precursor compound during the preparation of an alignment film may be used as a catalyst for imidization of precursors such as polyamic acid or polyamic acid ester.

In the case of previously used amine catalysts, although polyimide conversion rate may be secured to some degree, non-soluble materials were produced due to side reactions with polyimide precursors such as polyamic acid or polyamic acid ester, thus increasing the viscosity of the liquid crystal alignment agent composition and decreasing storage stability.

To the contrary, it was confirmed that in the present invention, by using the catalyst precursor compound having a structure represented by the Chemical Formula 1 as a catalyst, generation of by-products may be decreased compared to the previously used amine catalysts, thus securing storage stability, and simultaneously, excellent degree of imidization as an amine catalyst can be achieved, thus securing excellent physical properties of the alignment film.

It was also confirmed that in case the catalyst precursor compound having a structure represented by the Chemical Formula 1 is included in the liquid crystal alignment agent composition, isocyanate produced by the decomposition of the catalyst precursor compound during the preparation of a liquid crystal alignment film reacts with carboxylic acid in the liquid crystal alignment polymer to form amide, or reacts with amine to form urea, thereby improving the electrical properties of the liquid crystal alignment film.

As explained above, a liquid crystal alignment agent composition comprising the polymerizable liquid crystal alignment polymer; and the catalyst precursor compound represented by the Chemical Formula 1 may have a viscosity change rate represented by the following Mathematical Formula, of 5% or less, 0.1% or more and 5% or less, 1% or more and 5% or less, or 1% or more and 3% or less, or 2% or more and 3% or less.

A rate of viscosity change (%)=(viscosity of liquid crystal alignment agent composition after storage at room temperature for 7 days−viscosity of initial liquid crystal alignment agent composition)/viscosity of initial liquid crystal alignment agent composition*100  [Mathematical Formula 1]

Although a method of measuring the viscosity is not particularly limited, for example, it may be measured at 25° C., using Ubbelohde Viscometer II. Method for Preparing a Liquid Crystal Alignment Film According to another embodiment of the invention, a method for preparing a liquid crystal alignment film using the liquid crystal alignment agent composition is provided, which method comprises steps of: applying the liquid crystal alignment agent composition on a substrate to form a coating (step 1); drying the coating (step 2); and irradiating light to the coating or rubbing the coating to progress alignment treatment (step 3).

In the step 1, the above-mentioned liquid crystal alignment agent composition is applied on a substrate to form a coating. The details of the liquid crystal alignment agent composition include all the contents described in the above embodiment.

A method of applying the liquid crystal alignment agent composition on a substrate is not particularly limited, and for example, screen printing, offset printing, flexo printing, ink jet, and the like may be used.

And, the liquid crystal alignment agent composition may be dissolved or dispersed in an organic solvent. Specific examples of the organic solvent may include N,N-dimethylforamide, N,N-dimethylacetamide, N-methyl-2-pyrrolidone, N-methylcaprolactone, 2-pyrrolidone, N-ethylpyrrolidone, N-vinylpyrrolidone, dimethylsulfoxide, tetratmethylurea, pyridine, dimethylsulfone, hexamethylsulfoxide, 7-butyrolactone, 3-methoxy-N,N-dimethylpropaneamide, 3-ethoxy-N,N-dimethylpropaneamide, 3-buthoxy-N,N-dimethylpropaneamide, 1,3-dimethyl-imidazolidinone, ethylamylketone, methylnonylketone, methylethylketone, methylisoamylketone, methylisopropylketone, cyclohexanone, ethylenecarbonate, propylenecarbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These may be used alone or in combinations.

And, the liquid crystal alignment agent composition may further comprise other components, in addition to the organic solvent. As non-limiting examples, additives that can improve the uniformity of a film thickness or surface smoothness, improve adhesion of a liquid crystal alignment film and a substrate, change dielectric constant or conductivity of a liquid crystal alignment film, or increase denseness of a liquid crystal alignment film when the liquid crystal alignment agent composition is applied, may be additionally included. As such additives, various solvents, surfactants, silane-based compounds, dielectric substances or cross-linkable compounds, and the like may be mentioned.

In the step 2, the coating formed by applying the liquid crystal alignment agent composition on a substrate is dried.

The step of drying the coating may be conducted by a heating means such as a hot plate, a hot-air circulation furnace, an infrared furnace and the like, and the heat treatment may be performed at 50° C. to 130° C. or 70° C. to 130° C.

In the step 3, the coating is irradiated by light or rubbed to progress alignment treatment.

In the alignment treatment step, the coating may be a coating immediately after the drying step, or it may be a coating passing through heat treatment after the drying step. The "coating immediately after the drying step" means that light is immediately irradiated without progressing heat treatment to a temperature equal to or higher than that of the drying step, after the drying step, and other steps except heat treatment may be added.

In the step of alignment treatment, light irradiation may be conducted by irradiating polarized UV rays of 150 nm to 450 nm wavelength, Wherein, the intensity of light exposure may vary according to the kind of liquid crystal alignment polymer, and it may be 10 mJ/cm$^2$ to 10 J/cm$^2$, preferably 30 mJ/cm$^2$ to 2 J/cm$^2$.

As for the ultraviolet rays, polarized ultraviolet rays selected among the ultraviolet rays subjected to polarization treatment by a method of passing through or reflecting with a polarizing device using a substrate in which a dielectric anisotropic material is coated on the surface of a transparent substrate such as quartz glass, soda lime glass, soda lime-free glass, etc., a polarizer plate on which aluminum or metal wires are finely deposited, or a Brewster's polarizing device using the reflection of quartz glass, etc., may be irradiated to progress the alignment treatment. Herein, the polarized UV rays may be irradiated vertically to the surface of the substrate, or may be irradiated at an incident angle inclined at a specific angle. In this way, the alignment ability of liquid crystal molecules is imparted to the coating.

And, in the step of alignment treatment, a rubbing treatment may be conducted using rubbing cloth. More specifically, the rubbing treatment may be conducted by rubbing the surface of the heat-treated coating in one direction while rotating a rubbing roller having rubbing cloth attached to a metal roller.

In the step of heat treating the alignment-treated coating, a catalyst compound represented by the following Chemical Formula 7 may be included in the alignment-treated coating.

[Chemical Formula 7]

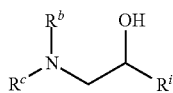

in the Chemical Formula 7, $R^b$, $R^c$ and $R^i$ are each independently, hydrogen or a C1-10 alkyl group.

According to the present invention, in the liquid crystal alignment agent composition, the catalyst precursor compound represented by the Chemical Formula 1 is added to inhibit catalysis in the composition, and then, the catalytic action in the composition is suppressed by adding a catalyst precursor compound represented by the Chemical Formula 1, and then in the alignment treatment step, the catalyst precursor compound represented by the Chemical Formula 1 may be induced so as to be separated into a catalyst compound represented by the Chemical Formula 7. Thereby, in the composition, dispersibility and stability of the catalyst precursor compound may be increased, and in the alignment film, polymerization reaction may be induced to realize improvement in film strength After the step of irradiating light to the coating or rubbing the coating to progress alignment treatment (step 3), if necessary, a step of heat treating the aligned coating to cure (step 4) may be further included. In the step 4, the alignment-treated coating is heat treated and cured. Herein, the heat treatment can be conducted by a heating means such as a hot plate, a hot-air circulation furnace, an infrared furnace and the like, and the heat treatment may be performed at a temperature of 100° C. to 150° C., or 130° C. or more and 150° C. or less.

Further, if necessary, the step of heat treating the alignment-treated coating to cure may include a step of heat treating the aligned coating at 100° C. to 150° C. and a step of heat treating the alignment-treated coating at 200° C. or more.

Meanwhile, after the step of drying the coating (step 2), if necessary, a step of heat treating the coating immediately after the drying step at a temperature equal to or higher than that of the drying step may be further included. The heat treatment may be conducted by a hot plate, a hot-air circulation furnace, an infrared heater, and the like, and preferably at 150° C. to 250° C. During this process, the liquid crystal alignment agent may be imidized.

Namely, the method for preparing a liquid crystal alignment film may comprise: applying the above-mentioned liquid crystal alignment agent on a substrate to form a coating (step 1); drying the coating (step 2); heat treating the coating immediately after the drying step at a temperature equal to or higher than that of the drying step (step 3); irradiating light to the heat treated coating or rubbing the heat treated coating to progress alignment treatment (step 4); and heat treating the alignment-treated coating to cure (step 5).

Further, if necessary, in the step of heat treating the alignment-treated coating to cure (step 5), a step of heat treating the alignment-treated coating at 100° C. to 150° C. and a step of heat treating the alignment-treated coating at 200° C. or more may be also included.

III. Liquid Crystal Alignment Film

According to yet another embodiment of the invention, a liquid crystal alignment film prepared according to the above-mentioned method for preparing a liquid crystal alignment film is provided. Specifically, the liquid crystal alignment film may comprise the aligned and cured product of the liquid crystal alignment agent composition of one embodiment. The aligned and cured product means a product obtained through the alignment process and curing process of the liquid crystal alignment agent composition of one embodiment.

As explained above, when the polymerizable liquid crystal alignment polymer; and the catalyst precursor compound represented by the Chemical Formula 1 are mixed and used, a liquid crystal alignment film exhibiting a sufficient degree of imidization even at a low baking temperature and having enhanced electrical properties can be prepared.

Although the thickness of the liquid crystal alignment film is not specifically limited, for example, it may be controlled within the range of 0.01 μm to 1 μm. If the thickness of the liquid crystal alignment film increases or decreases by a specific numerical value, the properties measured in the liquid crystal alignment film may be also changed as much as the numerical value.

The liquid crystal alignment film may have a degree of imidization of 70% or more, 70% or more and 90% or less, or 73% or more and 88% or less, or 75% or more and 86%, said rate being calculated by measuring the rate of imide structures in the polymer included in the alignment film, by measuring FT-IR spectrum by ART method.

IV. Liquid Crystal Display

Further, according to yet another embodiment of the invention, a liquid crystal display comprising the above-mentioned liquid crystal alignment film is provided.

The liquid crystal alignment film may be introduced in a liquid crystal cell by known methods, and the liquid crystal cell may be also introduced in the liquid crystal display by known methods. The liquid crystal alignment film is prepared from the liquid crystal alignment agent composition of one embodiment, and can realize excellent properties and excellent stability. Thus, a liquid crystal display capable of exhibiting high reliability is provided.

Advantageous Effects

According to the present invention, a liquid crystal alignment agent composition that exhibits a sufficient imidization ratio in the low-temperature baking process and can realize excellent electrical properties and alignment property, a method for preparing a liquid crystal alignment film using the same, and a liquid crystal alignment film and a liquid crystal display using the same, are provided.

DETAILED DESCRIPTION OF THE EMBODIMENTS

The present invention will be explained in more detail in the following examples. However, these examples are presented only as the illustrations of the present invention, and the contents of the present invention are not limited thereby.

Preparation Example 1: Synthesis of a Catalyst Precursor Compound A

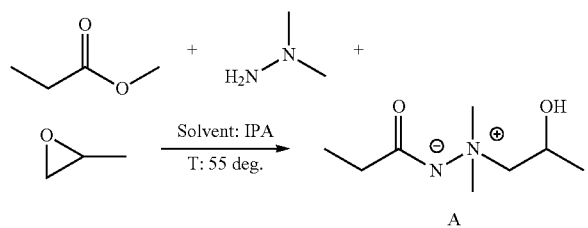

10.6 g (0.12 mol) of methyl propionate, 7 g (0.12 mol) of propylene oxide, and 7.24 g (0.12 mol) of dimethyl hydrazine were put in 121 ml of iso-propyl alcohol, and the mixture was stirred at 55° C. for 72 hours. The solvent was removed using a solvent condenser, followed by recrystallization using ethyl acetate to obtain white solid, which was dried in a vacuum oven to prepare 15 g (0.086 mol, yield 71%) of the catalyst precursor compound A.

Preparation Example 2: Synthesis of Catalyst Precursor Compound B

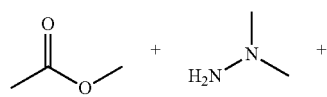

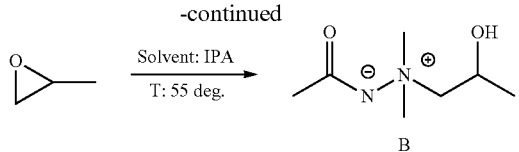

16 g (0.1 mol, yield 83%) of the catalyst precursor compound B was prepared by the same method as Preparation Example 1, except that methyl acetate was used instead of methyl propionate.

Example: Preparation of Liquid Crystal Alignment Agent Composition

Example: Preparation of Liquid Crystal Alignment Agent Composition, Liquid Crystal Alignment Film and Liquid Crystal Alignment Cell Example 1

(1) Preparation of a Liquid Crystal Alignment Agent Composition

A 250 mL three neck flask was fixed to a mechanical stirrer, and the flask was put in a container filled with water and ice and cooled. Thereafter, to the flask of nitrogen atmosphere, (E)-4-aminophenyl 3-(4-aminophenyl)acrylate (10.288 g, 0.040 mol) was dissolved in 99.668 g of N-methylpyrrolidone (NMP) and then stirred for 1 hour. Wherein, the temperature of the flask was maintained at 0° C. to 10° C. using ice.

Thereafter, while nitrogen gas was passed through, 7.3 g (0.037 mol) of cyclobutane-1,2,3,4-tetracarboxylic dianhydride (CBDA) was put in the flask, and polymerization was progressed for 24 hours.

20 g of the polymer was dissolved in a mixed solvent of 8.65 g of NMP, 19.95 g of GBL (γ-butyrolactone) and 11.4 g of 2-butoxyethanol to obtain a 5 wt % solution. And, 0.1 g of the catalyst precursor compound A of Preparation Example 1 was put in the obtained solution and dissolved, followed by pressure filtration with a filter made of poly(tetrafluoroethylene) having a pore size of 0.1 μm to prepare a liquid crystal alignment agent composition.

(2) Preparation of a Liquid Crystal Alignment Film

The liquid crystal alignment agent composition was applied onto a substrate (lower plate) in which comb-shaped IPS (in-plane switching) mode ITO electrode patterns having a thickness of 60 nm, an electrode width of 3 μm and a spacing between electrodes of 6 μm are formed on a rectangular glass substrate having a size of 2.5 cm×2.7 cm and onto a glass substrate (upper plate) having no electrode pattern each using a spin coating method.

Then, the substrates onto which the liquid crystal alignment agent composition was applied were placed on a hot plate at about 80° C. and dried for 100 seconds to evaporate solvents. In order to progress alignment treatment of the obtained coating, each coating of the upper/lower substrates was irradiated by 365 nm UV rays at the exposure of 0.1 to 10 J/c using an exposure equipment to which a line polarizer is attached. Thereafter, the alignment-treated upper/lower substrates were baked (cured) in an oven of about 150° C. for 30 minutes to obtain liquid crystal alignment films respectively having a film thickness of 0.1 m.

(3) Preparation of a Liquid Crystal Alignment Cell

A sealing agent into which a 4.5 m ball spacer was impregnated was applied at the edge of the upper substrate except a liquid crystal inlet. And, the upper and lower substrates were arranged such that the liquid crystal alignment films formed thereon face each other and the alignment directions are parallel to each other, and then, the upper and lower substrates were combined, and by UV and thermal curing of the sealing agent, an empty cell was prepared. And, into the empty cell, liquid crystal was introduced, and the inlet was sealed with a sealing agent, thus preparing a liquid crystal alignment cell.

Example 2

A liquid crystal alignment agent composition, a liquid crystal alignment film and a liquid crystal alignment cell were prepared by the same method as Example 1, except that the catalyst precursor compound B of Preparation Example 2 was not added to the solution instead of the catalyst precursor compound A of Preparation Example 1.

Example 3

A liquid crystal alignment agent composition, a liquid crystal alignment film and a liquid crystal alignment cell were prepared by the same method as Example 1, except that 2,4-diaminophenyl cinnamate was added instead of the (E)-4-aminophenyl 3-(4-aminophenyl)acrylate.

Example 4

A liquid crystal alignment agent composition, a liquid crystal alignment film and a liquid crystal alignment cell were prepared by the same method as Example 1, except that (E)-phenyl 3-(2,4-diaminophenyl)acrylate was added instead of the (E)-4-aminophenyl 3-(4-aminophenyl)acrylate.

Comparative Example 1

A liquid crystal alignment agent composition, a liquid crystal alignment film and a liquid crystal alignment cell were prepared by the same method as Example 1, except that the catalyst precursor compound A of Preparation Example 1 was not added.

Comparative Example 2

A liquid crystal alignment agent composition, a liquid crystal alignment film and a liquid crystal alignment cell were prepared by the same method as Example 1, except that N,N-dimethyldodecylamine was used instead of the catalyst precursor compound A of Preparation Example 1.

Comparative Example 3

A liquid crystal alignment agent composition, a liquid crystal alignment film and a liquid crystal alignment cell were prepared by the same method as Example 1, except that a mixture of amino alcohol represented by the following Chemical Formula A and isocyanate represented by the following Chemical Formula B was used instead of the catalyst precursor compound A of Preparation Example 1.

TABLE 1

Chemical Formula A

Chemical Formula B

| Category | Diamine | Anhydride | Additives |
|---|---|---|---|
| Example 1 | Diamine A | CBDA | Preparation Example 1 |
| Example 2 | Diamine A | CBDA | Preparation Example 2 |
| Example 3 | Diamine B | CBDA | Preparation Example 1 |
| Example 4 | Diamine C | CBDA | Preparation Example 1 |
| Comparative Example 1 | Diamine A | CBDA | — |
| Comparative Example 2 | Diamine A | CBDA | N,N-dimethyldodecylamine |
| Comparative Example 3 | Diamine A | CBDA | Chemical Formula A + Chemical Formula B |

*Chemical Formula A: 1-(dimethylamino)propan-2-ol
*Chemical Formula B: isocyanatoethane
*CBDA: cyclobutane-1,2,3,4-tetracarboxylic dianhydride
*Diamine A: (E)-4-aminophenyl 3-(4-aminophenyl)acrylate
*Diamine B: 2,4-diaminophenyl cinnamate
*Diamine C: (E)-phenyl 3-(2,4-diaminophenyl)acrylate

Experimental Example

1) Degree of Imidization (%)

For the liquid crystal alignment films obtained from the liquid crystal alignment agent compositions of Examples and Comparative Examples, FT-IR spectrum was measured by ATR method, thereby measuring the rate of imide structures in the polymer molecule included in the alignment film.

2) Evaluation of Liquid Crystal Alignment Property

To the upper and lower substrates of the liquid crystal cell prepared above, polarization plates were attached perpendicularly to each other. And, the liquid crystal cell to which the polarization plates were attached was placed on a backlight with a brightness of 7,000 cd/m$^2$, and light leak was observed with the unaided eye. Wherein, if the alignment property of the liquid crystal alignment film is excellent and liquid crystal is arranged well, light may not pass through the upper and lower polarization plates attached perpendicularly to each other, and it may be observed dark without defects. Such a case was evaluated as 'good', and if light leak such as bright point or liquid crystal flow mark is observed, evaluated as 'bad' in the Table 2.

3) Storage Stability

For the liquid crystal alignment agent compositions of Examples and Comparative Examples, the initial viscosity and the viscosity after storage at room temperature for 7 days were respectively measured, and a rate of viscosity change was measured by the following Mathematical Formula 1.

The viscosity of the liquid crystal alignment agent composition was measured at a temperature of 25° C., using Ubbelohde Viscometer, and the results were shown in the following Table 2. The lower the rate of viscosity change, the better the storage stability of the composition.

A rate of viscosity change (%)=(viscosity of liquid crystal alignment agent composition after storage at room temperature for 7 days–viscosity of the initial liquid crystal alignment agent composition)/viscosity of the initial liquid crystal alignment agent composition*100   [Mathematical Formula 1]

TABLE 2

| Category | Degree of imidization (%) | liquid crystal alignment property | Storage stability (%) |
| --- | --- | --- | --- |
| Example 1 | 76 | Good | 2 |
| Example 2 | 75 | Good | 3 |
| Example 3 | 84 | Good | 3 |
| Example 4 | 86 | Good | 3 |
| Comparative Example 1 | 52 | Bad | 2 |
| Comparative Example 2 | 78 | Good | 21 |
| Comparative Example 3 | 75 | Good | 18 |

As shown in Table 2, in the case of the liquid crystal alignment agent compositions of Examples 1 to 4, since the catalyst precursor compounds of specific structure synthesized in Preparation Examples 1 and Preparation Example 2 were used, very high degree of imidization of 75% to 86% was exhibited even at a curing temperature of 150° C. In addition, it was confirmed that the liquid crystal aligning agent composition exhibited excellent alignment properties, and at the same time, appeared a rate of viscosity change of 3% or less, which showed that the storage stability was very excellent and thus, the stability was greatly improved, and the final liquid crystal alignment layer passing through a heat treatment process could secure excellent liquid crystal alignment stability.

To the contrary, the alignment film obtained from the liquid crystal alignment agent composition of Comparative Example 1 that does not contain a catalyst exhibited degree of imidization of 52% and thus, it was confirmed that the liquid crystal alignment stability was inferior to Examples.

It was also confirmed that in the case of the liquid crystal alignment agent composition of Comparative Example 2, since tertiary amine N,N-dimethyldodecylamine previously used as a catalyst was used, it showed a viscosity change rate of 21%, which confirmed that storage stability was significantly inferior to Examples using a catalyst precursor compounds of specific structure in the liquid crystal alignment agent composition.

It was further confirmed that the liquid crystal alignment agent composition of Comparative Example 3 using amino alcohol and isocyanate made by rearrangement of the catalyst precursor compounds synthesized in Preparation Example 1 and Preparation Example 2 showed a viscosity change rate of 18%, which confirmed that the storage stability was significantly inferior to Examples using a catalyst precursor compounds of specific structure in the liquid crystal alignment agent composition.

The invention claimed is:

1. A liquid crystal alignment agent composition comprising:
   a cross-linkable liquid crystal alignment polymer; and
   a catalyst precursor compound represented by Chemical Formula 1,
   wherein the cross-linkable liquid crystal alignment polymer comprises at least one type of a repeat unit selected from the group consisting of a repeat unit represented by Chemical Formula 2, a repeat unit represented by Chemical Formula 3, and a repeat unit represented by Chemical Formula 4:

[Chemical Formula 1]

in the Chemical Formula 1, $R^a$ is a C1-10 alkyl group, a C1-10 alkoxy group, a C6-20 aryl group, a C6-20 arylcarbonyl group, or a C6-20 aryloxy group, $R^b$ and $R^c$ are each independently, hydrogen, a C1-10 alkyl group, a C1-10 alkoxy group, a C3-20 cycloalkyl group, or a C6-30 aryl group, $R^d$ is a C2-10 alkyl group, a C2-30 arylalkyl group, a C2-30 cycloalkylalkyl group, or a C2-10 alkoxyalkyl group, wherein $R^d$ is substituted with at least one hydroxyl group (—OH),

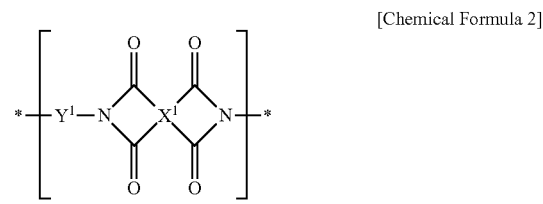

[Chemical Formula 2]

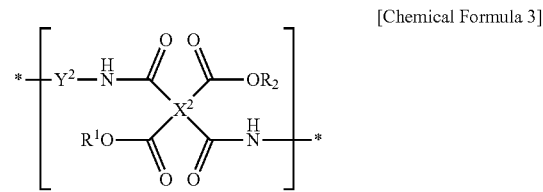

[Chemical Formula 3]

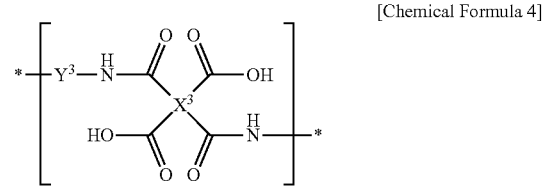

[Chemical Formula 4]

in the Chemical Formulae 2 to 4, at least one of $R^1$ and $R^2$ is a C1-10 alkyl group, and the other is hydrogen, $X^1$ to $X^3$ are each independently, a tetravalent functional group, and $Y^1$ to $Y^3$ are each independently, a divalent functional group including a photocross-linkable reactive group.

2. The liquid crystal alignment agent composition according to claim 1, wherein the $X^1$ to $X^3$ are each independently, one of tetravalent functional groups represented by Chemical Formula 5:

[Chemical Formula 5]

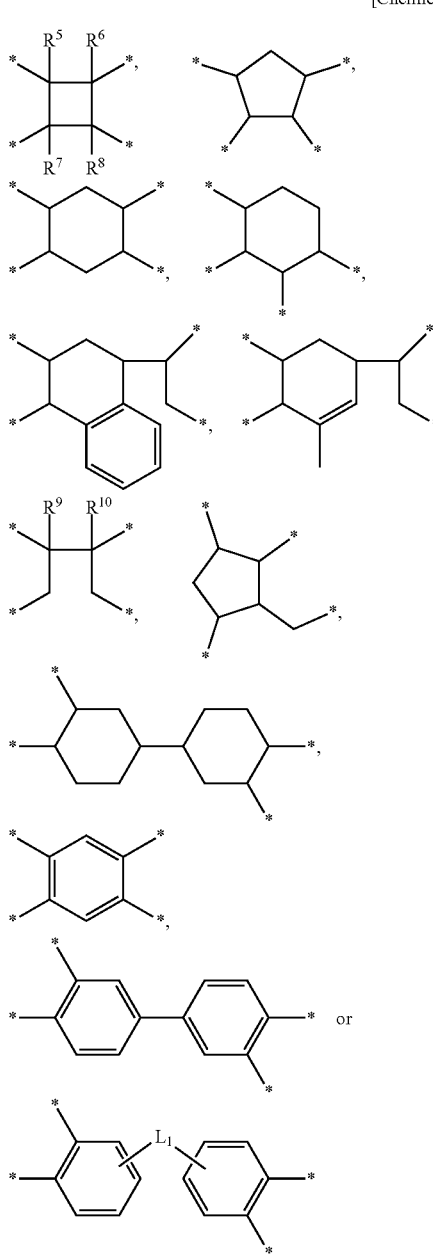

in the Chemical Formula 5,
$R^5$ to $R^{10}$ are each independently, hydrogen, or C1-10 alkyl;
$L^1$ is any one selected from the group consisting of a single bond, —O—, —CO—, —S—, —SO—, —SO$_2$—, —CR$^{11}$R$^{12}$—, —CONH—, —COO—, —(CH$_2$)$_b$—, —O(CH$_2$)$_b$O—, —COO—(CH$_2$)$_b$—OCO—, —R$^{13}$N—(CH$_2$)$_b$—NR$^{14}$—, phenylene and a combination thereof,
wherein $R^{11}$ to $R^{14}$ are each independently, hydrogen, a C1-10 alkyl group, or C1-10 haloalkyl group; and b is an integer of 1 to 10.

3. The liquid crystal alignment agent composition according to claim 1, wherein the Chemical Formula 1 is represented by Chemical Formula 1-1:

[Chemical Formula 1-1]

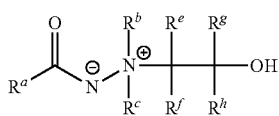

in the Chemical Formula 1-1,
$R^a$ is a C1-10 alkyl group, a C1-10 alkoxy group, a C6-20 aryl group, a C6-20 arylcarbonyl group, or a C6-20 aryloxy group,
$R^b$ and $R^c$ are each independently, hydrogen, a C1-10 alkyl group, a C1-10 alkoxy group, a C3-20 cycloalkyl group, or a C6-30 aryl group, and
$R^e$, $R^f$, $R^g$ and $R^h$ are each independently, hydrogen, a C1-10 alkyl group, a C1-10 alkoxy group, a C3-20 cycloalkyl group, or a C6-30 aryl group.

4. The liquid crystal alignment agent composition according to claim 1, wherein the Chemical Formula 1 is represented by Chemical Formula 1-2:

[Chemical Formula 1-2]

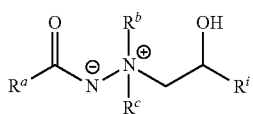

in the Chemical Formula 1-2,
$R^a$ is a C1-10 alkyl group, a C1-10 alkoxy group, a C6-20 aryl group, a C6-20 arylcarbonyl group, or a C6-20 aryloxy group,
$R^b$ and $R^c$ are each independently, hydrogen, a C1-10 alkyl group, a C1-10 alkoxy group, a C3-20 cycloalkyl group, or a C6-30 aryl group, and
$R^i$ is hydrogen, a C1-10 alkyl group, a C1-10 alkoxy group, a C3-20 cycloalkyl group, or a C6-30 aryl group.

5. The liquid crystal alignment agent composition according to claim 4, wherein in the Chemical Formula 1-2,
$R^a$, $R^b$, $R^c$ and $R^i$ are each independently, a C1-10 alkyl group.

6. The liquid crystal alignment agent composition according to claim 1, wherein the catalyst precursor compound represented by the Chemical Formula 1 is included in an amount of 0.1 to 30 parts by weight, based on 100 parts by weight of the crosslinkable liquid crystal alignment polymer.

7. The liquid crystal alignment agent composition according to claim 1, wherein a rate of viscosity change of the liquid crystal alignment agent composition according to Mathematical Formula 1 is 5% or less:

A rate of viscosity change (%)=(viscosity of liquid crystal alignment agent composition after storage at room temperature for 7 days−initial viscosity of liquid crystal alignment agent composition)/initial viscosity of liquid crystal alignment agent composition*100   [Mathematical Formula1]

in the Mathematical Formula 1, the viscosity and the initial viscosity of the liquid crystal alignment agent composition are measured at 25° C., using Ubbelohde Viscometer.

8. The liquid crystal alignment agent composition according to claim 1, wherein the divalent functional group including the photocrosslinkable reactive group comprises one of divalent organic groups represented by Chemical Formula 6-1 to Chemical Formula 6-3:

[Chemical Formula 6-1]

[Chemical Formula 6-2]

[Chemical Formula 6-3]

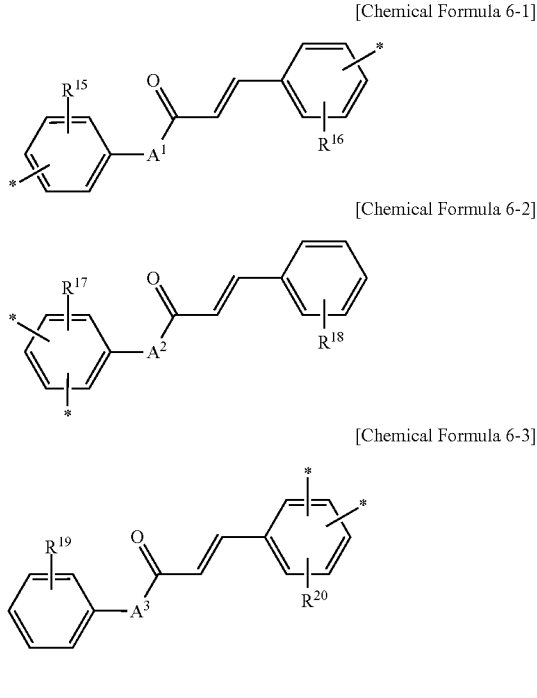

in the Chemical Formula 6-1 to Chemical Formula 6-3,
$A^1$ and $A^3$ is a direct bond, —O—, —S—, —NH—, or a C1-10 alkylene group, and
$R^{15}$ to $R^{20}$ are each independently, hydrogen or a C1-10 alkyl group.

9. A method for preparing a liquid crystal alignment film, comprising steps of:
applying the liquid crystal alignment agent composition of claim 1 on a substrate to form a coating;
drying the coating; and
irradiating light to the coating or rubbing the coating to perform alignment treatment.

10. The method according to claim 9, wherein the step of drying the coating is performed at a temperature of 50° C. to 130° C.

11. The method according to claim 9, further comprising a step of heat treating the alignment-treated coating to cure.

12. The method according to claim 11, wherein the step of heat treating the alignment-treated coating to cure comprises a step of heat treating the alignment-treated coating at a temperature of 100° C. to 150° C.

13. The method according to claim 9, wherein in the step irradiating light to the dried coating or rubbing the dried coating to perform alignment treatment, a catalyst compound represented by Chemical Formula 7 is included in the alignment-treated coating:

[Chemical Formula 7]

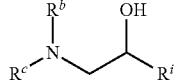

in the Chemical Formula7,
$R^b$, $R^c$ and $R^i$ are each independently, hydrogen or a C1-10 alkyl group.

14. A liquid crystal alignment film comprising the aligned and cured product of the liquid crystal alignment agent composition of claim 1.

15. A liquid crystal display comprising the liquid crystal alignment film of claim 14.

* * * * *